United States Patent
Kurita et al.

(10) Patent No.: US 12,495,364 B2
(45) Date of Patent: Dec. 9, 2025

(54) RADIO COMMUNICATION NODE

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 313 days.

(21) Appl. No.: 17/799,510

(22) PCT Filed: Feb. 13, 2020

(86) PCT No.: PCT/JP2020/005662
§ 371 (c)(1),
(2) Date: Aug. 12, 2022

(87) PCT Pub. No.: WO2021/161479
PCT Pub. Date: Aug. 19, 2021

(65) Prior Publication Data
US 2023/0072350 A1  Mar. 9, 2023

(51) Int. Cl.
*H04W 52/14* (2009.01)

(52) U.S. Cl.
CPC ............... *H04W 52/143* (2013.01)

(58) Field of Classification Search
CPC .. H04W 52/143; H04W 52/242; H04W 88/08
USPC ........................................................ 455/522
See application file for complete search history.

(56) References Cited

U.S. PATENT DOCUMENTS

| 10,470,136 B1 | 11/2019 | Ghosh et al. |
| 2012/0252479 A1 | 10/2012 | Morita et al. |
| 2013/0003680 A1 | 1/2013 | Yamamoto et al. |
| 2019/0297584 A1* | 9/2019 | Stauffer .............. H04B 17/336 |
| 2020/0107362 A1* | 4/2020 | Qi ...................... H04W 88/085 |

FOREIGN PATENT DOCUMENTS

| WO | 2011070733 A1 | 6/2011 |
| WO | 2011118577 A1 | 9/2011 |

OTHER PUBLICATIONS

International Search Report issued in Patent Application No. PCT/JP2020/005662 mailed on Sep. 8, 2020 (5 pages).
Written Opinion issued in Patent Application No. PCT/JP2020/005662 mailed on Sep. 8, 2020 (3 pages).
3GPP TR 38.874 V16.0.0, "3rd Generation Partnership Project; Technical Specification Group Radio Access Network; NR; Study on Integrated Access and Backhaul; (Release 16)" Dec. 2018 (111 pages).
Qualcomm, "New WID on Enhancements to Integrated Access and Backhaul", 3GPP TSG RAN Meeting #86, RP-192521, Sitges, Spain, Dec. 9-12, 2019 (20 pages).

(Continued)

*Primary Examiner* — Eugene Yun
(74) *Attorney, Agent, or Firm* — Osha Bergman Watanabe & Burton LLP

(57) ABSTRACT

A radio communication node is disclosed including a transmitting/receiving unit that transmits/receives a radio signal to/from an upper node forming an integrated access backhaul; and a control unit that reports, to the upper node, power control information used for transmission power control of a downlink in the upper node.

5 Claims, 13 Drawing Sheets

(56) References Cited

OTHER PUBLICATIONS

Office Action issued in counterpart Chinese Application No. 202080095534.0, mailed Apr. 23, 2024 (17 pages).
Office Action issued in Chinese Application No. 202080095534.0; Dated Oct. 8, 2024 (8 pages).

* cited by examiner

FIG. 5
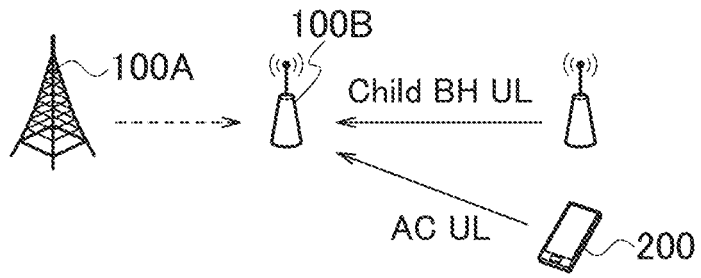
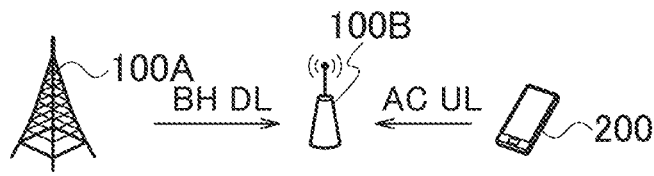
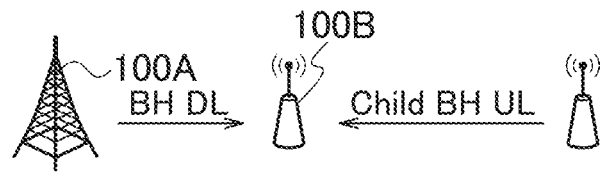
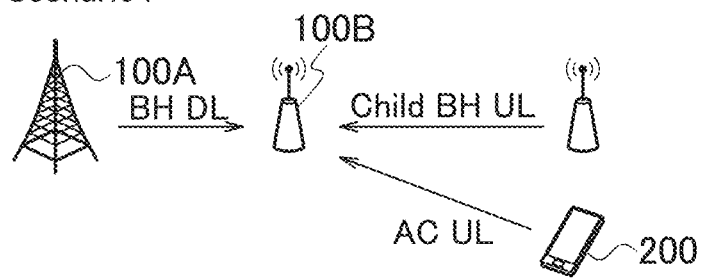

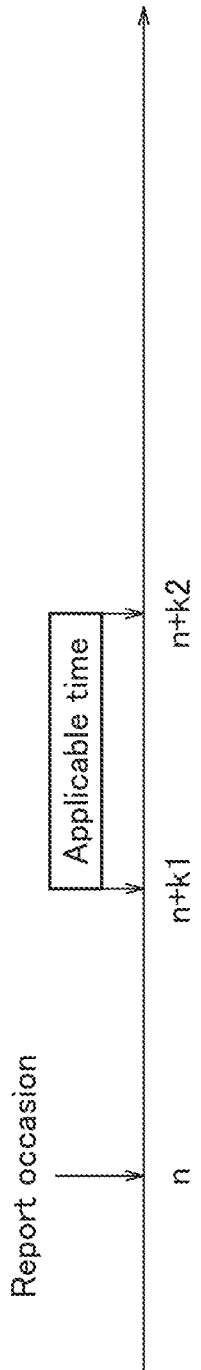

Example 1 : applies to MT-DL

Example 2 : applies to MT-DL and MT-F

Example 3 : applies to MT-DL overlapped with DU hard-U or soft-U:

Example 1 : applies to DU hard-UL and soft-UL

Example 2 : applies to DU hard-UL and soft-UL overlapped with MT-D and MT-F

Example 1 : IAB reports for each MT-DL resource

In this case, the report is 3-bit

Example 2 : IAB reports for each MT-DL and MT-F resource

In this case, the report is 6-bit

FIG. 10A

| Bit field | value |
|---|---|
| 0 | X |
| 1 | Y |

FIG. 10B

| Bit field | value |
|---|---|
| 0 | X1~X2 |
| 1 | Y1~Y2 |

FIG. 10C

| Bit field | value |
|---|---|
| 0 | 0*granularity |
| 1 | 1*granularity |

Applicable time (1)
Report content :
-Power#1
-Power#2
-Power#3

(2)
Report content :
-Power#1
-Offset to power#1
-Offset to power#1

FIG. 12A

MT: D D D U U U F F F
DU: D U F D U F D U F on all resources reported by IAB node

FIG. 12B

MT: D D D U U U F F F
DU: D U F D U F D U F e.g. parent node only apply to MT resource overlapped with DU-UL

DU | D | U | F | D | U | F | D | U | F | e.g. parent node only apply to MT resource overlapped with DU-UL

RADIO COMMUNICATION NODE

TECHNICAL FIELD

The present disclosure relates to a radio communication node that sets a radio access and a radio backhaul.

BACKGROUND ART

The 3rd Generation Partnership Project (3GPP) has specified Long Term Evolution (LTE), and for the purpose of further increasing the speed of the LTE, LTE-Advanced (hereinafter referred to as LTE including LTE-Advanced), and furthermore, 5G New Radio (NR) or a successor system of the LTE called Next Generation (NG), and the like is being specified.

For example, in the radio access network (RAN) of the NR, Integrated Access and Backhaul (IAB) in which radio access to a terminal (User Equipment, UE) and a radio backhaul between radio communication nodes such as radio base stations (gNB) are integrated has been considered (see Non Patent Literature 1).

In the IAB, an IAB node has a Mobile Termination (MT), which is a function for connecting to a parent node (may also be referred to as an IAB donor), and a Distributed Unit (DU), which is a function for connecting to a child node or UE.

In Release 16 of 3GPP, the radio access and the radio backhaul are premised on half-duplex communication (Half-duplex) and time division multiplexing (TDM). Furthermore, in Release 17, application of frequency division multiplexing (FDM), space division multiplexing (SDM), and full-duplex communication (Full-duplex) is being considered (Non Patent Literature 2). In other words, simultaneous operation of the MT and the DU is being considered.

CITATION LIST

Non Patent Literature

Non Patent Literature 1
3GPP TR 38.874 V16.0.0, 3rd Generation Partnership Project; Technical Specification Group Radio Access Network; NR; Study on Integrated Access and Backhaul; (Release 16), 3GPP, December 2018
Non Patent Literature 2
"New WID on Enhancements to Integrated Access and Backhaul", RP-192521, 3GPP TSG RAN Meeting #86, 3GPP, December 2019

SUMMARY OF INVENTION

However, the simultaneous operation of the MT and the DU has the following problems. Specifically, when the MT and the DU receive a radio signal using the same time resource, it is assumed that a difference occurs between the power of the radio signal received by the MT and the power (hereinafter referred to as received power) of the radio signal received by the DU.

If such a difference in the received power is large, a radio signal with low received power cannot be normally received. This is because a radio signal with high received power interferes with a radio signal with low received power.

Furthermore, when a receiver is shared between the MT and the DU in the radio communication node, a radio signal with low received power may fall out of the receivable range if matched with a radio signal with high received power.

Therefore, the following disclosure is contrived in view of such a situation, and aims to provide a radio communication node capable of normally receiving a radio signal even when the Mobile Termination (MT) and the Distributed Unit (DU) operate simultaneously in the Integrated Access and Backhaul (IAB).

According to one aspect of the present disclosure, there is provided a radio communication node (radio communication node 100B) including a transmitting/receiving unit (a radio transmitting unit 161 and a radio receiving unit 162) that transmits/receives a radio signal to/from an upper node (radio communication node 100A) forming an integrated access backhaul; and a control unit (control unit 170) that reports, to the upper node, power control information used for downlink transmission power control in the upper node.

BRIEF DESCRIPTION OF DRAWINGS

FIG. 5 is a view illustrating an example of a scenario in which transmission power control capable of avoiding transmission power imbalance is required.

FIG. 6 is a view illustrating an example of an application period of the report according to operation example 1.

FIG. 10A is a view illustrating a configuration example of a bit field according to operation example 1 (Option 2-1).

FIG. 10B is a view illustrating a configuration example of a bit field according to operation example 1 (Option 2-1).

FIG. 10C is a view illustrating a configuration example of a bit field according to operation example 1 (Option 2-1).

FIG. 12A is a view illustrating an example of a resource to which the report according to operation example 3 (Option 1) is applied.

FIG. 12B is a view illustrating an example of a resource to which the report according to operation example 3 (Option 1) is applied.

FIG. 13A is a view illustrating an example of a resource to which the report according to operation example 3 (Option 2) is applied.

FIG. 13B is a view illustrating an example of a resource to which the report according to operation example 3 (Option 2) is applied.

DESCRIPTION OF EMBODIMENTS

Figure 1:
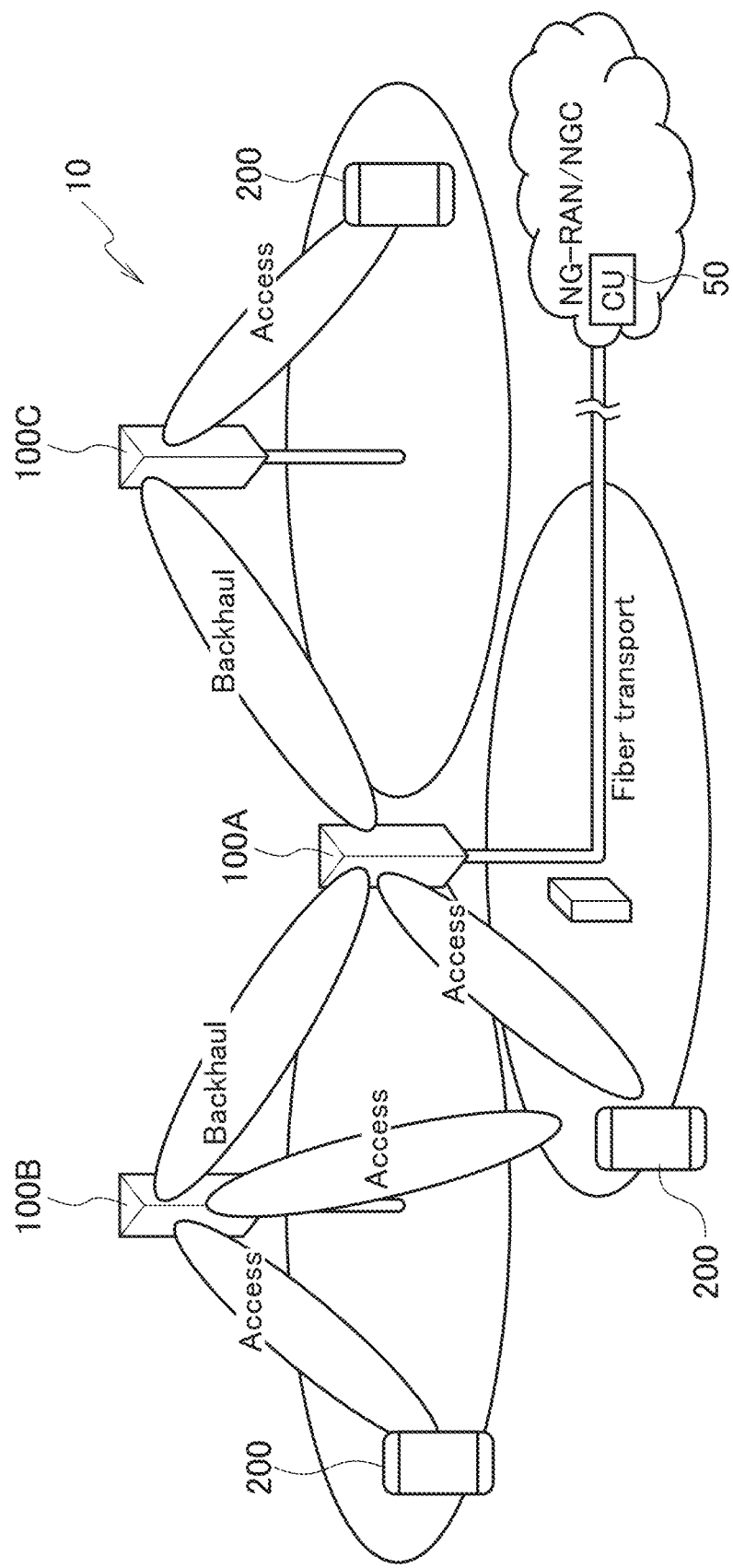
FIG. 1 is an overall schematic configuration view of a radio communication system 10.

An embodiment will be described below with reference to the drawings. The same functions and configurations are denoted with the same or similar reference numerals, and the description thereof will be appropriately omitted.

(1) Overall Schematic Configuration of Radio Communication System

FIG. 1 is an overall schematic configuration view of a radio communication system 10 according to the present embodiment. The radio communication system 10 is a radio communication system compliant with the 5G New Radio (NR), and includes a plurality of radio communication nodes and terminals.

Specifically, the radio communication system 10 includes radio communication nodes 100A, 100B, 100C and a terminal 200 (hereinafter referred to as UE 200, User Equipment).

The radio communication nodes 100A, 100B, 100C can set a radio access with the UE 200 and a radio backhaul (BH) between the radio communication nodes. Specifically, a backhaul (transmission path) by a radio link is set between the radio communication node 100A and the radio communication node 100B, and between the radio communication node 100A and the radio communication node 100C.

The configuration in which the radio access with the UE 200 and the radio backhaul between the radio communication nodes are integrated in such manner is called an Integrated Access and Backhaul (IAB).

The IAB reuses existing functions and interfaces defined for radio access. In particular, Mobile-Termination (MT), gNB-DU (Distributed Unit), gNB-CU (Central Unit), User Plane Function (UPF), Access and Mobility Management Function (AMF) and Session Management Function (SMF), as well as corresponding Interfaces such as NR Uu (MT to gNB/DU), F1, NG, X2 and N4 are used as the baseline.

The radio communication node 100A is connected to an NR radio access network (NG-RAN) and a core network (Next Generation Core (NGC) or 5GC) via a wired transmission path such as a fiber transport. The NG-RAN/NGC includes a Central Unit 50 (hereinafter referred to as CU50) that is a communication node. It should be noted that the NG-RAN and the NGC may be simply expressed as "network".

Note that the CU 50 may be configured by any of the above UPF, AMF, SMF or a combination thereof. Alternatively, the CU 50 may be a gNB-CU as described above.

Figure 2:
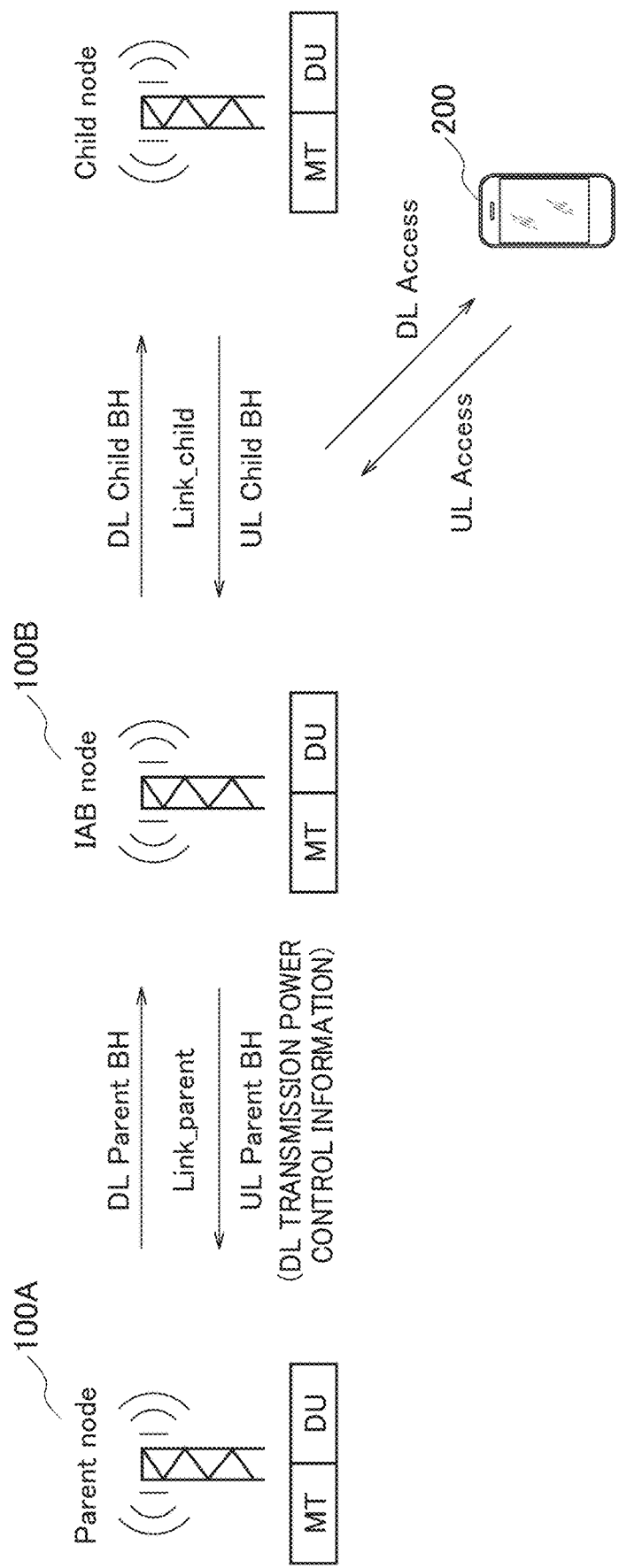
FIG. 2 is a view illustrating a basic configuration example of the IAB.

FIG. 2 is a view illustrating a basic configuration example of the IAB. As illustrated in FIG. 2, in the present embodiment, the radio communication node 100A forms a parent node (Parent node) in the IAB, and the radio communication node 100B (and the radio communication node 100C) forms an IAB node in the IAB. Note that the parent node may be referred to as an IAB donor.

A child node (Child node) in the IAB is configured by another radio communication node not illustrated in FIG. 1. Alternatively, the UE 200 may configure a child node.

A radio link is set up between the parent node and the IAB node. Specifically, a radio link referred to as Link_parent is set.

A radio link is set up between the IAB node and the child node. Specifically, a radio link referred to as Link_child is set.

A radio link established between such radio communication nodes is referred to as a radio backhaul link. Link_parent is formed by a DL Parent BH in the downlink (DL) direction and a UL Parent BH in the uplink (UL) direction. Link_child is formed by a DL Child BH in the DL direction and a UL Child BH in the UL direction.

That is, in the IAB, the direction from the parent node to the child nodes (including UE 200) is the DL direction, and the direction from the child node to the parent node is the UL direction.

The radio link set between the UE 200 and the IAB node or the parent node is referred to as a radio access link. Specifically, the radio link is configured by a DL Access in the DL direction and a UL Access in the UL direction.

The IAB node has a Mobile Termination (MT), which is a function for connecting to a parent node (may also be called an upper node), and a Distributed Unit (DU), which is a function for connecting to a child node (or UE 200). The child node may be referred to as a lower node.

Similarly, the parent node has an MT for connecting with an upper node and a DU for connecting with a lower node such as an IAB node. The parent node may have a CU (Central Unit) instead of the MT.

Furthermore, similarly to the IAB node and the parent node, the child node also has an MT for connecting with an upper node such as the IAB node and a DU for connecting with a lower node such as the UE 200.

Radio resources used by the DU are, in terms of DU, DL, UL, and Flexible time-resource (D/U/F), and the radio resources are classified into one of the types, Hard, Soft or Not Available (H/S/NA). Furthermore, available (available) or unavailable (not available) is also defined in the software (S).

Note that the IAB configuration example illustrated in FIG. 2 uses CU/DU division, but the IAB configuration is not necessarily limited to such a configuration. For example, in the radio backhaul, the IAB may be configured by tunneling using GPRS Tunneling Protocol (GTP)-U/User Datagram Protocol (UDP)/Internet Protocol (IP).

The main advantage of such an IAB is that NR cells can be arranged flexibly and at high density without densifying the transport network. The IAB can be applied to various scenarios such as arrangement of small cells outdoors, indoors, and even support for mobile relays (e.g., in buses and trains).

As illustrated in FIGS. 1 and 2, the IAB may also support NR-only standalone (SA) development, or non-standalone (NSA) development including other RATs (such as LTE).

In the present embodiment, the radio access and the radio backhaul can operate as half-duplex communication (Half-duplex) or full-duplex communication (Full-duplex).

Furthermore, as the multiplexing scheme, time division multiplexing (TDM), space division multiplexing (SDM) and frequency division multiplexing (FDM) can be used.

That is, in the present embodiment, the simultaneous operation of the DU and the MT of the IAB node is realized by using FDM/SDM.

(2) Functional Block Configuration of Radio Communication System

Next, the functional block configurations of the radio communication node 100A, the radio communication node 100B, and the UE 200 that form the radio communication system 10 will be described.

(2.1) Radio Communication Node 100A

Figure 3:
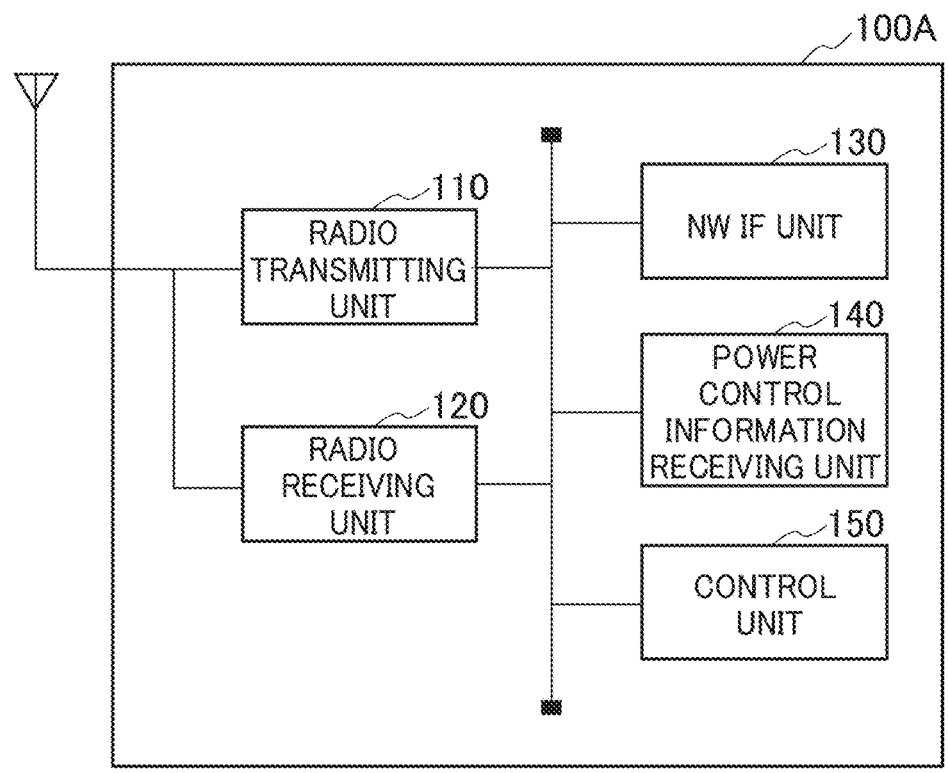
FIG. 3 is a functional block configuration view of a radio communication node 100A.

FIG. 3 is a functional block configuration view of the radio communication node 100A that forms a parent node. As illustrated in FIG. 3, the radio communication node 100A includes a radio transmitting unit 110, a radio receiving unit 120, a NW IF unit 130, a power control information receiving unit 140, and a control unit 150.

The radio transmitting unit 110 transmits a radio signal compliant with the 5G specifications. In addition, the radio receiving unit 120 transmits a radio signal compliant with the 5G specifications. In the present embodiment, the radio transmitting unit 110 and the radio receiving unit 120 execute radio communication with the radio communication node 100B that forms the IAB node.

In the present embodiment, the radio communication node 100A has the functions of the MT and the DU, and the radio transmitting unit 110 and the radio receiving unit 120 also transmit and receive radio signals in correspondence with the MT/DU.

The NW IF unit 130 provides a communication interface that realizes a connection with the NGC side or the like. For example, the NW IF unit 130 may include interfaces such as X2, Xn, N2, N3.

The power control information receiving unit 140 receives the power control information transmitted from the IAB node. Specifically, the power control information receiving unit 140 may receive power control information used for DL transmission power control in the parent node, that is, the radio communication node 100A.

The power control information may be any information that enables DL transmission power control. For example, it may be information directly indicating that the DL transmission power needs to be reduced, or may be a numerical value related to the DL transmission power control. The numerical value may be, for example, a value of the UL received power in the IAB node, or a difference between the DL received power and the UL received power in the IAB node.

Furthermore, the power control information may include a combination of information that directly indicates that the DL transmission power needs to be reduced and a numerical value related to the DL transmission power control.

The control unit 150 executes control of each functional block forming the radio communication node 100A. Particularly, in the present embodiment, the control unit 150 can control the transmission power of the DL of the DU based on the power control information received by the power control information receiving unit 140.

(2.2) Radio Communication Node 100B

Figure 4:
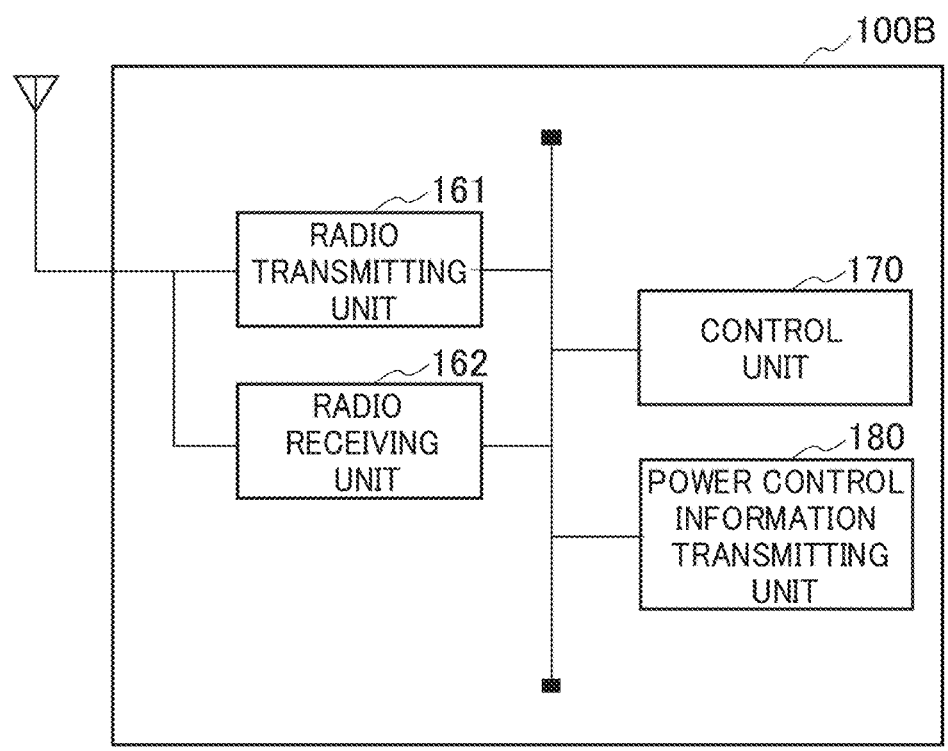
FIG. 4 is a functional block configuration view of a radio communication node 100B.

FIG. 4 is a functional block configuration view of the radio communication node 100B that forms an IAB node. As illustrated in FIG. 4, the radio communication node 100B includes a radio transmitting unit 161, a radio receiving unit 162, a control unit 170, and a power control information transmitting unit 180.

The radio transmitting unit 161 transmits a radio signal according to the 5G specifications. In addition, the radio receiving unit 162 transmits a radio signal according to the 5G specifications. In the present embodiment, the radio transmitting unit 161 and the radio receiving unit 162 execute radio communication with the radio communication node 100A that forms the parent node and the radio communication with the child node (including the case of the UE 200).

In the present embodiment, the radio transmitting unit 161 and the radio receiving unit 162 form a transmitting/receiving unit that transmits/receives a radio signal to/from an upper node, specifically, a radio communication node 100A that forms an integrated access backhaul (IAB).

The control unit 170 executes control of each functional block forming the radio communication node 100B. In particular, in the present embodiment, the control unit 170 can execute processing related to power control information used for transmission power control in a parent node (upper node) or a child node (lower node).

Specifically, the control unit 170 can report power control information used for DL transmission power control in the upper node to the upper node. The control unit 170 can control the power control information transmitting unit 180 and transmit appropriate power control information to the upper node.

As described above, the power control information is not particularly limited as long as it is information that enables DL transmission power control in an upper node such as a parent node.

For example, the control unit 170 can report power control information indicating the necessity of DL transmission power control in the upper node. The necessity of the transmission power control may simply indicate whether or not the transmission power control is necessary, or may explicitly request the reduction of the DL transmission power of the DL transmission power.

Further, the control unit 170 can also report power control information including a numerical value related to the DL transmission power in the upper node. As described above, the numerical value may be, for example, a value of the UL received power in the IAB node, or a difference between the DL received power and the UL received power in the IAB node. Other specific examples of the numerical value will be described later.

The control unit 170 may report the power control information as described above based on an instruction (trigger) from an upper node, for example, a parent node (radio communication node 100A).

Furthermore, the power control information may include information designating a resource to be subject to DL transmission power control in the upper node. That is, the upper node may control the DL transmission power (e.g., reduce the DL transmission power) only for the designated resource (which may be referred to as a radio resource).

The power control information transmitting unit 180 may transmit the power control information to the parent node (upper node) or the child node (lower node).

Specifically, the power control information transmitting unit 180 can transmit the power control information to the upper node under the control of the control unit 170. The power control information may be transmitted, for example, by uplink control information (UCI), medium access control-control element (MAC-CE), or upper layer (e.g., radio resource control layer (RRC)) signaling.

(3) Operation of Radio Communication System

Next, the operation of the radio communication system 10 will be described. Specifically, the DL transmission power control operation between the parent node (upper node) and the IAB node will be described.

(3.1) Multiplexing and Communication Method in IAB

When the FDM or the SDM is applied in the radio backhaul or the radio access, especially within the antenna panel, the radio backhaul transmission power is usually much higher than the radio access transmission power, so that a problem in that the reception performance of the IAB node and the like lowers may arise due to the power imbalance between the radio backhaul and the radio access.

Specifically, in the following scenarios, transmission power control capable of avoiding transmission power imbalance is required.

FIG. 5 illustrates an example of a scenario in which transmission power control capable of avoiding transmission power imbalance is required. As illustrated in FIG. 5, there are four scenarios 1 to 4. Each scenario is as follows from the viewpoint of the IAB node (radio communication node 100B).

Scenario 1: Simultaneous reception of UL Child BH and UL Access at the IAB node.
Scenario 2: Simultaneous reception of DL Parent BH and DL Parent BH at the IAB node.
Scenario 3: Simultaneous reception of DL Parent BH and UL Child BH at the IAB node.
Scenario 4: Simultaneous reception of UL Child BH and UL Access at the IAB node.

In scenarios 2 to 4, the DL transmission power control of the parent node (radio communication node 100A) may be required to avoid transmission power imbalance.

Furthermore, in the IAB, in a case of simultaneous reception of the DL Parent BH and the UL Access, the transmission power of the DL Parent BH may affect the UL Access. Therefore, in the allocation of the DL transmission power in the parent node, the UL Access status (channel status) in the IAB node needs to be considered.

Information that assists the transmission power control (which may be called power control information or assist information) may be reported from the IAB node to the parent node.

(3.2) Operation Example

In the following, an operation example will be described in which the received power of each of the MT and the DU is equalized and simultaneous reception of the MT and the DU is possible when the MT and the DU of the IAB node operate by the FDM, the SDM or the Full Duplex.

(3.2.1) Operation Overview

An overview of the operation example described below is as follows.
(Operation example 1): Contents reported by the IAB node to the parent node for DL transmission power control.

(Option 1): The IAB node reports whether or not the parent node needs to reduce the DL transmission power.
(Option 1-1): Report using one bit, and apply the control for a certain interval (may be read as fixed period. The same applies hereinafter).
(Option 1-2): Use bitmap and report using one bit for each resource.
(Option 2): The IAB node reports the value related to the DL transmission power control.
(Option 2-1): The IAB node reports one value related to the DL transmission power control and applies it for a certain interval.
Contents to be reported (example): UL received power, difference between the DL received power and the UL received power, expected DL received power, DL received power drop value, expected DL transmission power, expected DL transmission power drop value.
Value to be reported (example): Absolute value, offset value from a fixed value, offset value from the first reported value, offset value from the value reported immediately before.
Bit field configuration (example): Value unique to each bit field, value with a range in each bit field, multiplication value with respect to a coefficient of each bit field.
(Option 2-2): Report continuous values within a certain interval for the DL transmission power control.
(Option 3): Combination of Option 1 and Option 2.
The IAB node reports the need for the DL transmission power control and the value related to power control.
(Operation example 2): Method of reporting the DL transmission power control.
(Option 1): Parent node triggers the report.
(Option 1-1): Use the UCI to report periodically, semi-persistently, or aperiodically.
(Option 1-2): Use MAC CE or upper layer to report periodically, semi-permanently or aperiodically.
(Option 2): The IAB node triggers reporting.
(Operation example 3): Control operation in the parent node and the IAB node.
(Option 1): In the case of (Option 1) in (operation example 1) (report whether it is necessary to reduce the DL transmission power).
No reporting: The DL transmission power is implementation-dependent, or the parent node reduces the DL transmission power.
Reporting made: The DL transmission power is implementation-dependent, parent node reduces the DL transmission power, or the parent node reduces the DL transmission power only for the designated specific resource.
(Option 2): In the case of (Option 2) in (operation example 1) (report the value related to the DL transmission power control).
No reporting: The DL transmission power is implementation-dependent, or the parent node reduces the DL transmission power.
Reporting made: The DL transmission power is implementation-dependent, parent node reduces the DL transmission power, or the parent node reduces the DL transmission power only for the designated specific resource.

(3.2.2) Operation Example 1

In the present operation example, some options may be set for the report content as described above. Hereinafter, each Option will be described more specifically.

(3.2.2.1) Option 1-1

In the case of reporting using one bit, the operation may be as follows.

- Alt. 1: When UL Access is received, for example, it may be set to "1". When set to "0", it may mean that UL Access is not received.
- Alt. 2: When UL Access is received and the power difference between the DL Parent BH and the UL Access exceeds a threshold value, for example, it may be set to "1". When set to "0", it may mean that the UL Access is not received or the power difference between the DL Parent BH and the UL Access is below the threshold value. The threshold value may be defined in advance in the specifications. Alternatively, it may be set by the RRC.
- Alt. 3: When UL Access is received and the power of the DL Parent BHL exceeds a threshold value, for example, it may be set to "1". When set to "0", it may mean that the UL Access is not received or the power of the DL Parent BH is below the threshold value. The threshold value may be defined in advance in the specifications. Alternatively, it may be set by the RRC.
- Alt. 4: When UL Access is received and the power of the UL Access is below a threshold value, for example, it may be set to "1". When set to "0", it may mean that the UL Access is not received or the power of the UL Access exceeds the threshold value. The threshold value may be defined in advance in the specifications. Alternatively, it may be set by the RRC.
- Alt. 5: For example, when set to "1", it may mean that the reduction of the DL transmission power is necessary, and when set to "0", it may mean that reduction of the DL transmission power is not necessary. The setting of "0" or "1" may be implementation-dependent.

FIG. 6 illustrates an example of an application period of the report according to operation example 1. As illustrated in FIG. 6, n is a transmission opportunity of a report, and the content of the report may be applied to an interval from n+k1 to n+k2.

Furthermore, the granularity of n/k1/k2 may be slots, symbols (may be referred to as OFDM symbols), or symbol groups.

k1 and k2 may be predefined in the specification. Alternatively, it may be set by the RRC. Alternatively, k2 may be omitted and the content of the report may be applied from n+k1 until the next report is received.

Figure 7A:
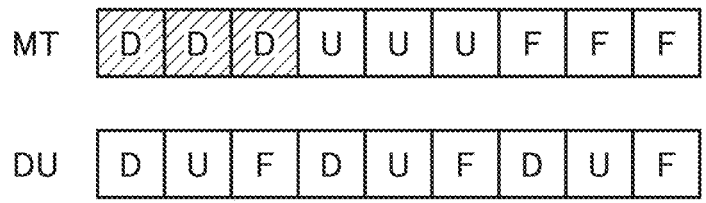
FIG. 7A is a view illustrating an example (part 1) of a resource to which the report according to operation example 1 (Option 1-1) is applied.
Figure 7B:
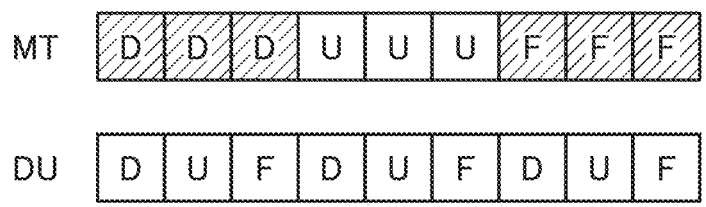
FIG. 7B is a view illustrating an example (part 1) of a resource to which the report according to operation example 1 (Option 1-1) is applied.
Figure 7C:
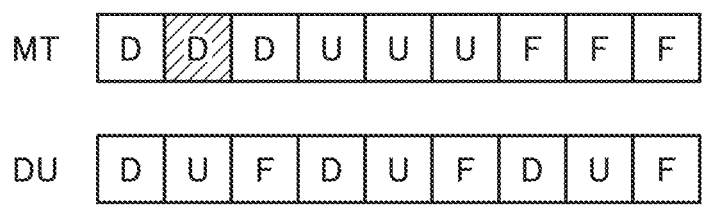
FIG. 7C is a view illustrating an example (part 1) of a resource to which the report according to operation example 1 (Option 1-1) is applied.
Figure 8A:
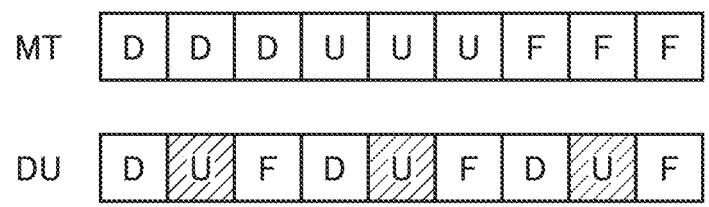
FIG. 8A is a view illustrating an example (part 2) of a resource to which the report according to operation example 1 (Option 1-1) is applied.
Figure 8B:
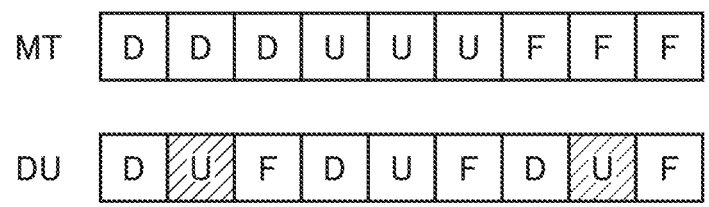
FIG. 8B is a view illustrating an example (part 2) of a resource to which the report according to operation example 1 (Option 1-1) is applied.

FIGS. 7A, 7B, and 7C illustrate an example (part 1) of a resource to which the report according to operation example 1 (Option 1-1) is applied. Furthermore, FIGS. 8A and 8B illustrate an example (part 2) of a resource to which the report according to operation example 1 (Option 1-1) is applied. The shaded areas in the figure illustrate examples of target resources to which the report content is applied (the same applies below).

The report by the IAB node described above may be applied to the following resources.

- Alt. 1: Report applies to all resources related to the MT timing.
- Alt. 2: Report applies to all resources related to the DU timing.
- Alt. 3: Report applies to MT resources of any of the following resource types.
  MT-DL/MT-F.
  Overlap with MT-DL/MT-F.
  DU-hard-UL/DU-hard-F.
  DU-soft-UL/DU-soft-F.
  DU-soft-UL/DU-soft-F indicated as IA.
  When report in the DU-F link direction is supported, DU-hard-F/DU-soft-F/DU-soft-F reported as IA may be reported as UL.

Note that "IA" means that the DU resource is explicitly or implicitly indicated as available. In addition, "INA" means that the DU resource is explicitly or implicitly indicated as unavailable.

The resource granularity may be slots/symbols/symbol groups. For example, the report may be applied to the MT slot if the slot includes symbols of the resource types mentioned above.

- Alt. 4: Report applies to any of the following DU resource types.
  DU-hard-UL/DU-hard-F.
  DU-soft-UL/DU-soft-F/DU-soft-UL indicated as IA.
  When report in the DU-F link direction is supported, DU-hard-F/DU-soft-F/DU-soft-F reported as IA may be reported as UL.
  DU-hard-UL/DU-hard-F overlap with MT-D/MT-F.
  DU/soft-UL/DU-soft-F/DU-soft-UL, which indicates that the IA overlaps with the MT-D/MT-F, may be indicated as IA/DU-soft-F.
  When report in the DU-F link direction is supported, DU-hard-F/DU-soft-F/DU-soft-F indicated as IA reported that the IA overlaps with the MT-D/MT-F.

The resource granularity may be slots/symbols/symbol groups. For example, the report may be applied to the DU slot if the slot includes symbols of the resource types mentioned above.

(3.2.2.2) Option 1-2

Figure 9A:
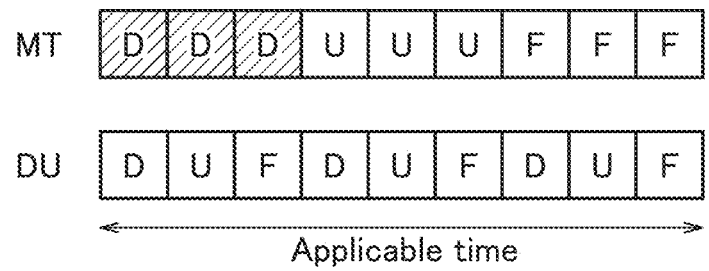
FIG. 9A is a view illustrating an example of a resource to which the report according to operation example 1 (Option 1-2) is applied.
Figure 9B:
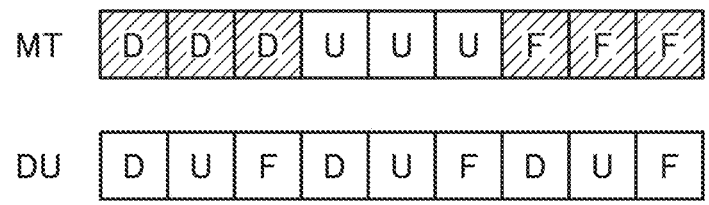
FIG. 9B is a view illustrating an example of a resource to which the report according to operation example 1 (Option 1-2) is applied.

In the present option, a one-bit bitmap may be reported for each resource for a fixed period. FIGS. 9A and 9B illustrate examples of resources to which the report according to operation example 1 (Option 1-2) is applied.

In the present option as well, the resource granularity may be slots/symbols/symbol groups. For example, one-bit information may be reported for each slot.

The report contents of each resource may be the same as in Option 1-1. Furthermore, the period in which the report is applied may be the same as in Option 1-1.

For example, n is a transmission opportunity of a report, and the content of the report by the IAB node may be applied to an interval from n+k1 to n+k2 (see FIG. 6). Furthermore, the resource type to which the report is applied may be the same as in Option 1-1.

(3.2.2.3) Option 2-1

In the present option, the IAB node can report the reference power of the DL transmission power control of the parent node, one reference value is reported for a fixed period, and the content of the report may be applied for that period.

The reference power reported by the IAB node may be any of the following.

- Alt. 1: UL received power in the IAB node.
- Alt. 2: Difference between the DL received power and the UL received power in the IAB node.

In Alt. 1/2, when the parent node can estimate the DL path loss between the parent node and the IAB node (e.g., DL Reference Signal Received Power (RSRP) or UL radio signal (RS) measurement having channel correlation), the parent node may determine the DL transmission power based on the UL received power and the DL path loss in the IAB node to avoid power imbalance.

Alt. 3: DL Rx power expected in the IAB node.
Alt. 4: Reduction of the DL Rx power in the IAB node is expected.

In Alt. 3/4, when the parent node can estimate the DL path loss between the parent node and the IAB node (e.g., DL Reference Signal Received Power (RSRP) or UL radio signal (RS) measurement having channel correlation), the parent node may determine the DL transmission power based on the expected DL received power and the DL path loss to avoid power imbalance.

Alt. 5: DL transmission power expected in the parent node.
Alt. 6: Expected reduction amount of the DL transmission power in the parent node.

When using Alt. 5/6, the parent node may determine the DL transmission power based on the reported expected DL transmission power.

Furthermore, the reference value described above may be reported as any of the following.

Alt. 1: Absolute value.
Alt. 2: Offset value from the value predefined in the specification. Or it is set by the RRC.
Alt. 3: Offset value from the first reported value.

The first report may be an absolute value, a predefined value or an offset value from the set value.

Alt. 4: Offset value from the value reported immediately before.

FIGS. 10A, 10B, and 10C illustrate a configuration example of a bit field according to operation example 1 (Option 2-1).

The bit field of the report content may be configured as any of the following.

Alt. 1: Each bit field is mapped to a value predefined in the specification. Or it is set by the RRC.
Alt. 2: Each bit field is mapped to a range of values predefined in the specification. Or it is set by the RRC.
Alt. 3: Each bit field is mapped to a multiple of the granularity predefined in the specification. Or it is set by the RRC. For example, when the report content is k, the parent node may interpret the value as k* granularity.

The value of the bit field may be indicated by an absolute value or an offset value. Option 1 may also be considered as a special case of Option 2. In Option 1, when the power difference between the DL Parent BH and the UL Access exceeds the threshold value, "1" may be set, and if not, "0" may be set.

In Option 2, "1" may be mapped to a value of a certain range (from threshold value to predetermined value) and "0" may be mapped to a value of another range (from predetermined value to threshold value).

The applied time may be the same as in Option 1-1. When there is no UL transmission or when reduction of the DL power is not necessary, the report content may be any of the following.

Alt. 1: Implementation-dependent.
Alt. 2: The content of the report is set to the value predefined in the specification.

For example, when the UL received power of the IAB node is reported, the content of the report may be set to "0" predefined in the specifications if there is UL reception.

(3.2.2.4) Option 2-2

Figure 11:
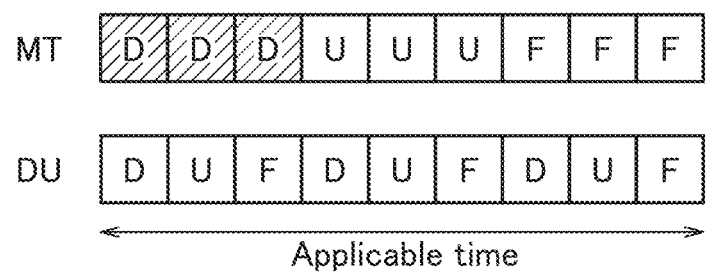
FIG. 11 is a view illustrating an example of a resource to which the report according to operation example 1 (Option 2-2) is applied.

In the present option, a series of reference values are reported for each resource for a fixed period. FIG. 11 illustrates an example of resources to which the report according to operation example 1 (Option 2-2) is applied.

The IAB node can report the reference value for the DL transmission power control of the parent node. In the present option as well, the resource granularity may be slots/symbols/symbol groups.

The report content of each resource may be any of the following.

Alt. 1: Same as Option 2-1.
Alt. 2: The first resource is reported following Option 2-1 and the offset values from the first value are reported for other resources.

The bit field indicating the offset value may be the same as in Option 2-1. The time in which the report is applied may be the same as in Option 1-1. The IAB node may report on resources in the period from n+k1 to n+k2.

Furthermore, the resource type to which the report is applied may be the same as in Option 1-1. The IAB node may report, for example, the reference value of each MT DL resource.

(3.2.2.5) Option 3

The present option is a combination of Option 1 and Option 2. Specifically, the following combinations may be applied.

Option 3-1: Combination of Options 1-1 and 2-1.
The IAB node reports whether or not the reduction of the DL transmission power is necessary and the reference (power) of the DL transmission power control.

Option 3-2: Combination of Options 1-1 and 2-2.
The IAB node reports whether or not the reduction of the DL transmission power is necessary and the DL transmission power control reference (power) for each resource.

Option 3-3: Combination of Options 1-2 and 2-1.
The IAB node reports whether or not the reduction of the DL transmission power is necessary for each resource, and the reference (power) of the DL transmission power control is applied to all resources.

Option 3-4: Combination of Options 1-2 and 2-2.
The IAB node reports whether or not the reduction of the DL transmission power is necessary for each resource, and the reference (power) of the DL transmission power control is applied to all resources.

In the above combinations, the contents of Option 1 and Option 2 may be reported separately or together.

(3.2.3) Operation Example 2

In the present operation example, some options may be set as described above for the method of reporting the DL transmission power control. Hereinafter, each Option will be described more specifically.

(3.2.3.1) Option 1-1

Periodic, semi-persistent or aperiodic reporting through the UCI may follow the framework of the Channel State Information (CSI). New CSI report content may be introduced.

(3.2.3.2) Option 1-2

The IAB node realizes periodic, semi-persistent or aperiodic reporting by the MAC CE and the upper layer signaling. Specifically, it may be reported as follows.
- In the case of periodic reporting, the parent node sets the reporting period and offset value in the RRC.
- In the case of semi-persistent reporting, the parent node sets the reporting period and offset value in the RRC. The reporting may also be activated by the MAC CE or the DCI.
- In the case of aperiodic reporting, the parent node sets the offset value in the RRC. The reporting may be triggered by the MAC CE or the DCI.
- Resources for reporting may be determined by the setting through the RRC or designation by the parent node using the DCI, and may be requested by the UE 200 if no resources are available.

(3.2.3.3) Option 2

In this option, reporting is triggered by the IAB node. Specifically, the IAB node may trigger reporting based on at least one of the following events.
- Alt. 1: When the difference between the DL received power and the UL received power becomes larger than the threshold value predefined in the specification, or when set by the RRC.
- Alt. 2: When the DL received power becomes larger than the threshold value predefined in the specification. Or when it is set by the RRC.
- Alt. 3: When the UL received power becomes lower than the threshold value predefined in the specification. Or when it is set by the RRC.
- Alt. 4: When the performance (UL reception block error rate (BLER), etc.) becomes lower than the threshold value predefined in the specification. Or when it is set by the RRC.

The reporting may be sent through the UCI, the MAC CE or the upper layer signaling. Moreover, resources for reporting may be determined by the setting through the RRC or designation by the parent node using the DCI, and may be requested by the UE 200 if no resources are available. For example, resources for periodic reporting may be reserved and set by the parent node.

(3.2.4) Operation Example 3

Regarding the control of DL transmission power in the parent node and the IAB node, the parent node and the IAB node may operate as follows.

(3.2.4.1) Option 1

In the case of (Option 1) of (operation example 1) (report on whether or not it is necessary to reduce the DL transmission power), if there is no report on whether or not the DL transmission power control is necessary, the parent node and the IAB node may operate according to any of the following.
- Alt. 1: DL transmission power may be implementation-dependent. In this case, the IAB node does not have to expect reduction of the DL transmission power.
- Alt. 2: The parent node reduces the DL transmission power, and the IAB node expects reduction of the DL transmission power of the resource overlapping with the DU resource having at least one of the following resource types.
  - DU-hard-UL/DU-hard-F.
  - DU-soft-UL/DU-soft-F/DU-soft-UL indicated as IA.
  - When report in the DU-F link direction is supported, DU-hard-F/DU-soft-F/DU-soft-F reported as IA may be reported as UL.

On the other hand, in the case of (Option 1) of (operation example 1) (report on whether or not it is necessary to reduce the DL transmission power), if there is report on whether or not the DL transmission power control is necessary, the parent node and the IAB node may operate according to any of the following.
- Alt. 1: DL transmission power may be implementation-dependent.
- Alt. 2: The parent node reduces the DL transmission power, and the IAB node expects the DL transmission power to be reduced for the resource reported by the IAB node as requiring power reduction.
- Alt. 3: When the report includes resources that cannot be applied, the parent node reduces the DL transmission power, and the IAB node expects the DL transmission power to be reduced for the resource reported by the IAB node as requiring power reduction.

The type of applicable resource may be the same as (Option 1) in (operation example 1), and may be, for example, a DU UL resource overlapping with the MT-DL resource.

On the other hand, resources that are not applied may operate as below.
- Alt. 3-1: The parent node ignores the report on the resources that are not applied, and applies the content of the report content only to the resources that can be applied.
- Alt. 3-2: The parent node expects a report that power reduction is not necessary.

FIGS. 12A and 12B illustrate examples of resources to which the report according to operation example 3 (Option 1) is applied. Specifically, FIG. 12A corresponds to Alt. 2, and FIG. 12B corresponds to Alt. 3-1.

For example, "1" may mean that reduction of the DL transmission power is necessary. Furthermore, the parent node may reduce the DL transmission power for resources in the shaded area in the figure.

Moreover, in the case of Alt. 3-2, the report may be considered an error case. If the report content can be applied only to the MT resource that overlaps with the DU-UL, the report content (shaded area) in FIG. 12A may be set to "0, 1, 0" (in this case, "0" means error).

(3.2.4.2) Option 2

In the case of (Option 2) of (operation example 1) (report value related to the DL transmission power control), if there is no report on whether or not the DL transmission power control is necessary, the parent node and the IAB node may operate according to any of the following.
- Alt. 1: DL transmission power may differ depending on the implementation. The IAB nodes do not expect reduction of the DL transmission power.

Alt. 2: The parent node reduces the DL transmission power. The IAB node expects reduction of the DL transmission power of a resource that overlaps with the DU resource having at least one of the following resource types, and assumes the worst case of power imbalance. For example, when the UL received power is reported, the parent node assumes that the UL received power is the minimum value that the IAB node can report.

DU-hard-UL/DU-hard-F.

DU-soft-UL/DU-soft-F/DU-soft-UL indicated as IA.

When report in the DU-F link direction is supported, DU-hard-F/DU-soft-F/DU-soft-F reported as IA may be reported as UL.

On the other hand, in the case of (Option 2) of (operation example 1) (report on whether or not it is necessary to reduce the DL transmission power), if there is report on whether or not the DL transmission power control is necessary, the parent node and the IAB node may operate according to any of the following.

Alt. 1: DL transmission power may be implementation-dependent.

Alt. 2: The parent node reduces the DL transmission power, and the IAB node expects reduction of the DL transmission power when the report corresponds to the predefined rules. For example, the parent node and the IAB node may operate as follows.

The parent node reduces the DL transmission power when the UL received power is reported and the reported UL received power is below the threshold value.

The parent node reduces the DL transmission power when the difference between the DL received power and the UL received power is reported and the reported difference exceeds the threshold value.

The parent node follows the power reported by the IAB node when the expected DL transmission power/DL received power or the reduction of the expected DL transmission power/DL received power is reported.

Alt. 3: When the report includes resources that cannot be applied, the parent node reduces the DL transmission power, and the IAB node expects the DL transmission power to be reduced when the report corresponds to a predefined rule and the resources are applicable.

The type of applicable resource may be the same as (Option 1) in (operation example 1), and may be, for example, a DU UL resource overlapping with the MT-DL resource.

On the other hand, resources that are not applied may operate as below.

Alt. 3-1: The parent node ignores the report on the resources that are not applied, and applies the content of the report content only to the resources that can be applied.

Alt. 3-2: The parent node expects the value predefined in the specification to be reported.

FIGS. 13A and 13B illustrate examples of resources to which the report according to operation example 3 (Option 2) is applied. Specifically, FIG. 13A corresponds to Alt. 2, and FIG. 13B corresponds to Alt. 3-1.

For example, the IAB node may report the UL received power of all MT-DL resources. The threshold value is 15, and the content of the report can be "10, 10, 10" or the like.

Moreover, in the case of Alt. 3-2, the report may be considered an error case. If the report content can be applied only to the MT resource that overlaps with the DU-UL, the report content (shaded area) in FIG. 12A may be set to "0, 10, 0" (in this case, "0" means error).

(4) Operation/Effect

According to the embodiment described above, the following operations and effects are obtained. Specifically, according to the IAB node (radio communication node 100B), the power control information used for the DL transmission power control in the parent node (upper node) can be reported to the parent node. Therefore, the parent node can reduce the DL transmission power as needed based on the power control information. As a result, the power imbalance between the radio communication nodes forming the IAB can be suppressed.

Thus, in the IAB, even when the MT and the DU operate simultaneously, each radio communication node can normally receive a radio signal.

In the present embodiment, the IAB node can report the power control information indicating the necessity of DL transmission power control in the parent node. Therefore, the parent node can reliably reduce the DL transmission power when necessary.

In the present embodiment, the IAB node can report the power control information indicating a numerical value (value of UL received power etc.) related to the DL transmission power control in the parent node. Therefore, the parent node can realize more appropriate DL transmission power control based on the numerical value.

In the present embodiment, the IAB node can report the power control information based on the instruction from the parent node. Therefore, the DL transmission power control can be realized at an appropriate timing when the transmission power control becomes necessary.

In the present embodiment, the power control information may include information that designates a resource to become the target of the transmission power control. Therefore, more precise DL transmission power control in the parent node can be realized.

(5) Other Embodiments

Although the embodiment has been described above, it is obvious to those skilled in the art that the present invention is not limited to the description of the embodiment and various modifications and improvements can be made.

For example, in the embodiment described above, names such as parent node, IAB node, and child node were used, but the names may be differed only when the configuration of the radio communication node in which the radio backhaul between radio communication nodes such as gNB and the radio access with the terminal are integrated is adopted. For example, it may be simply referred to as a first node, a second node, and the like, or may be referred to as an upper node, a lower node or a relay node, an intermediate node, and the like.

Furthermore, the radio communication node may be simply referred to as a communication device or a communication node, or may be read as a radio base station.

In the embodiment described above, the terms downlink (DL) and uplink (UL) are used, but they may be called in other terms. For example, the terms may be replaced or associated with terms such as forward ring, reverse link, access link, and backhaul. Alternatively, terms such as a first link, a second link, a first direction, a second direction, etc. may be simply used.

Moreover, the block configuration views (FIGS. 3 and 4) used to describe the above embodiment illustrate blocks of functional units. Those functional blocks (structural components) can be realized by an arbitrary combination of at least one of hardware and software. The method for realizing each functional block is not particularly limited. That is, each functional block may be realized by one device combined physically or logically, or two or more devices separated physically or logically may be directly or indirectly connected (e.g., wired, or wireless) to each other and such plural devices may be used to realize each functional block. The functional blocks may be realized by combining software with the one device or the plural devices mentioned above.

Functions include judging, determining, deciding, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like, but are not limited thereto. For example, a functional block (structural component) that causes transmission may be referred to as a transmitting unit or a transmitter. For any of the above, as explained above, the method for realizing is not particularly limited to any one method.

Figure 14:
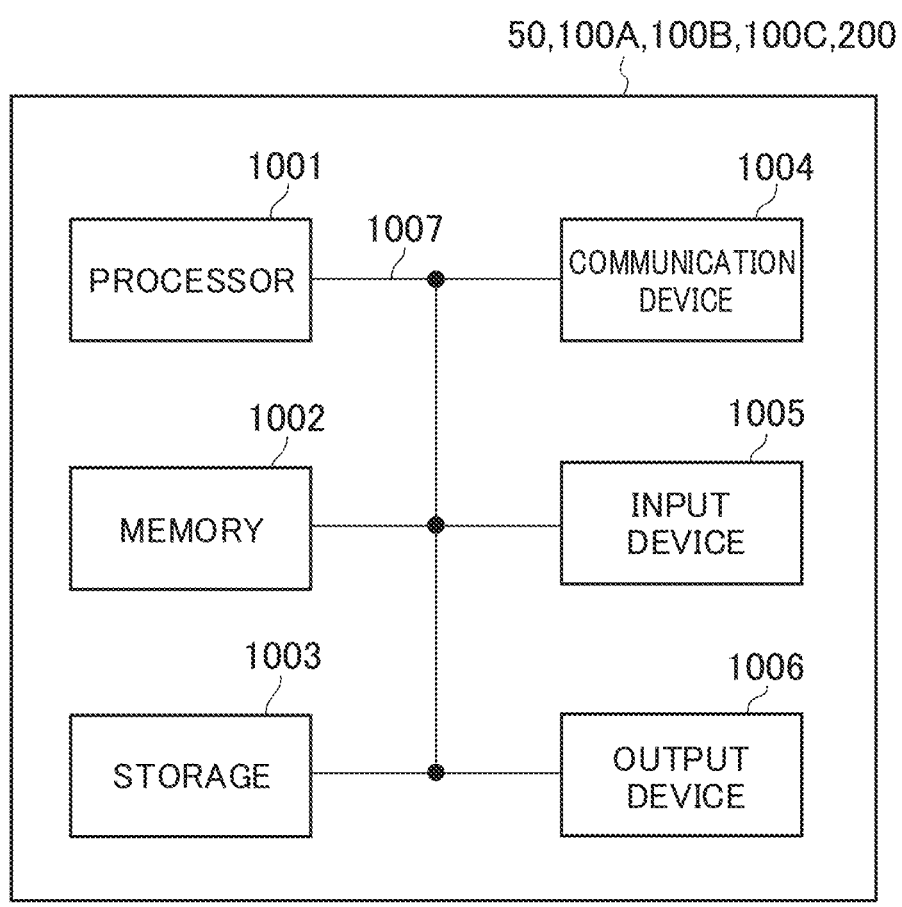
FIG. 14 is a view illustrating an example of a hardware configuration of a CU 50, radio communication nodes 100A to 100C, and a UE 200.

Furthermore, the CU 50, the radio communication nodes 100A to 100C, and the UE 200 (the device) described above may function as a computer that performs the process of the radio communication method of the present disclosure. FIG. 14 is a view illustrating an example of a hardware configuration of the device. As illustrated in FIG. 14, the device may be configured as a computer device including a processor 1001, a memory 1002, a storage 1003, a communication device 1004, an input device 1005, an output device 1006, a bus 1007, and the like.

Furthermore, in the following explanation, the term "device" can be read as a circuit, device, unit, and the like. The hardware configuration of the device may be configured by including one or a plurality of the devices illustrated in the figure, or may be configured by without including some of the devices.

Each functional block (see FIGS. 3 and 4) of the device can be realized by any of the hardware elements of the computer device or a combination of the hardware elements.

Moreover, the processor 1001 performs computing by loading a predetermined software (computer) on hardware such as the processor 1001 and the memory 1002, and various functions of the device are realized by controlling communication via the communication device 1004 and controlling at least one of read or write of data on the memory 1002 and the storage 1003.

The processor 1001, for example, operates an operating system to control the entire computer. The processor 1001 may be configured with a central processing unit (CPU) including an interface with a peripheral device, a control device, a computing device, a register, and the like.

Moreover, the processor 1001 reads a program (program code), a software module, data, and the like from at least one of the storage 1003 and the communication device 1004 into the memory 1002, and executes various processes according to the data. As the program, a program that causes a computer to execute at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be referred to as register, cache, main memory (main storage device), and the like. The memory 1002 can save therein a program (program codes), software modules, and the like that can execute the method according to one embodiment of the present disclosure.

The storage 1003 is a computer readable recording medium and is configured, for example, with at least one of an optical disk such as Compact Disc ROM (CD-ROM), a hard disk drive, a flexible disk, a magneto-optical disk (e.g., a compact disk, a digital versatile disk, Blu-ray (Registered Trademark) disk), a smart card, a flash memory (e.g., a card, a stick, a key drive), a floppy (Registered Trademark) disk, a magnetic strip, and the like. The storage 1003 can be referred to as an auxiliary storage device. The recording medium described above can be, for example, a database including at least one of the memory 1002 and the storage 1003, a server, or other appropriate medium.

The communication device 1004 is hardware (transmitting/receiving device) for performing communication between computers through at least one of a wired network or a wireless network, and is also referred to as, for example, a network device, a network controller, a network card, a communication module, and the like.

The communication device 1004 may be configured to include a high-frequency switch, a duplexer, a filter, a frequency synthesizer, and the like in order to realize, for example, at least one of Frequency Division Duplex (FDD) and Time Division Duplex (TDD).

The input device 1005 is an input device (e.g., a keyboard, a mouse, a microphone, a switch, a button, a sensor, and the like) that accepts input from the outside. The output device 1006 is an output device (e.g., a display, a speaker, an LED lamp, and the like) that outputs data to the outside. Note that, the input device 1005 and the output device 1006 may be integrated (e.g., a touch screen).

In addition, the respective devices, such as the processor 1001 and the memory 1002, are connected to each other with the bus 1007 for communicating information. The bus 1007 may be formed using a single bus or may be formed using different buses between the devices.

Furthermore, the device may be configured to include hardware such as a microprocessor, a digital signal processor (Digital Signal Processor: DSP), Application Specific Integrated Circuit (ASIC), Programmable Logic Device (PLD), and Field Programmable Gate Array (FPGA), and some or all of these functional blocks may be realized by the hardware. For example, the processor 1001 may be implemented using at least one of these hardware.

Notification of information is not limited to the aspect/embodiment described in the present disclosure, and may be performed using a different method. For example, the notification of information may be performed by physical layer signaling (e.g., Downlink Control Information (DCI), Uplink Control Information (UCI), upper layer signaling (e.g., RRC signaling, Medium Access Control (MAC) signaling, broadcasting information (Master Information Block (MIB), System Information Block (SIB)), other signals, or a combination thereof. The RRC signaling may be referred to as RRC message, for example, and may be RRC Connection Setup message, RRC Connection Reconfiguration message, or the like.

Each aspect/embodiment described in the present disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (Registered Trademark)), IEEE 802.20, Ultra-WideBand (UWB), Bluetooth (registered trademark), a system using any other appropriate system, and a next-generation system expanded based on the above. Furthermore, a plurality of systems may be combined (e.g., a combination of at least one of the LTE and the LTE-A and the 5G).

As long as there is no inconsistency in the processing procedure, sequence, flowchart, and the like of each aspect/embodiment described in the present disclosure, the order may be interchanged. For example, elements of various steps have been mentioned using an exemplary order in the method described in the present disclosure, but they are not limited to the specific order mentioned above.

The specific operation assumed to be performed by the base station in the present disclosure may be performed by its upper node in some cases. In a network including one or more network nodes having a base station, it is apparent that the various operations performed for communication with the terminal may be performed by at least one of the base station and another network node other than the base station (e.g., MME, S-GW, etc. may be considered, but not limited thereto). A case where there is one network node other than the base station has been described above, but a combination of a plurality of other network nodes (e.g., MME and S-GW) may be adopted.

Information and signals (information etc.) can be output from the upper layer (or lower layer) to the lower layer (or upper layer). The information and the like may be input and output via a plurality of network nodes.

The input/output information can be saved in a specific location (e.g., a memory) or can be managed using a management table. The information to be input/output can be overwritten, updated, or added. The output information can be deleted. The input information can be transmitted to another device.

The decision may be made by a value (0 or 1) represented by one bit or by a truth value (Boolean: true or false), or may be made by comparison of numerical values (e.g., comparison with a predetermined value).

Each aspect/embodiment described in the present disclosure may be used alone or in combination, or may be switched in accordance with the execution. Furthermore, notification of predetermined information (e.g., notification of "being X") is not limited to being performed explicitly, and may be performed implicitly (e.g., without notifying the predetermined information).

Regardless of whether being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Furthermore, software, instruction, information, and the like may be transmitted and received via a transmission medium. For example, when software is transmitted from a website, a server, or some other remote source using at least one of a wired technology (coaxial cable, optical fiber cable, twisted pair, Digital Subscriber Line (DSL), or the like) and a wireless technology (infrared light, microwave, or the like), at least one of these wired and wireless technologies is included within the definition of the transmission medium.

Information, signals, or the like described in the present disclosure may be represented using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or an arbitrary combination thereof.

It should be noted that the terms described in the present disclosure and the terms necessary for understanding the present disclosure may be replaced with terms having the same or similar meanings. For example, at least one of a channel and a symbol may be a signal (signaling). Furthermore, a signal may be a message. Moreover, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be represented using a relative value from a predetermined value, or may be represented using other corresponding information. For example, the radio resource can be indicated by an index.

The name used for the above parameter should not be restrictive in any respect. In addition, formulas and the like that use these parameters may be different from those explicitly disclosed in the present disclosure. As the various channels (e.g., PUCCH, PDCCH, etc.) and information element can be identified by any suitable name, the various names assigned to these various channels and information elements should not be restrictive in any aspect.

In the present disclosure, terms such as "base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (e.g., three) cells (also referred to as sectors). In a case where the base station accommodates a plurality of cells, the entire coverage area of the base station can be divided into a plurality of smaller areas, and each of such smaller areas can provide a communication service by a base station subsystem (e.g., a small base station for indoor use (Remote Radio Head: RRH)).

The term "cell" or "sector" refers to a part of or all of the coverage area of at least one of a base station and a base station subsystem that performs a communication service in the relevant coverage.

In the present disclosure, the terms "mobile station (MS)", "user terminal", "user equipment (UE)", "terminal" and the like can be used interchangeably.

The mobile station is sometimes called by the persons skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be referred to as a transmitting device, a receiving device, a communication device, or the like. Note that, at least one of the base station and the mobile station may be a device mounted on a moving body, a moving body itself, or the like. The moving body may be a vehicle (e.g., a car, an airplane, etc.), a moving body that moves unmanned (e.g., a drone, an automatically driven vehicle, etc.), or a robot (manned type or unmanned type). At least one of the base station and the mobile station also includes a device that does not necessarily move at the time of the communication operation. For example, at least one of the base station and the mobile station may be an Internet of Things (IoT) device such as a sensor.

Furthermore, a base station in the present disclosure may be read as a mobile station (user terminal, hereinafter the same). For example, the configuration in which the communication between the base station and the mobile station is replaced by a communication between a plurality of mobile stations (e.g., may be referred to as Device-to-Device (D2D), Vehicle-to-Everything (V2X), etc.) may be applied with each aspects/embodiment of the present disclosure. In this case, the mobile station may have the function of the base station. Words such as "uplink" and "downlink" may also be read with words corresponding to inter-terminal communication (e.g., "side"). For example, an uplink channel, a downlink channel, or the like may be read as a side channel.

Similarly, the mobile station in the present disclosure may be read as a base station. In this case, the base station may have the function of the mobile station.

A radio frame may be formed by one or more frames in the time domain. Each frame or frames in the time domain may be referred to as a subframe. A subframe may also be formed by one or more slots in the time domain. The subframe may have a fixed time length (e.g., 1 ms) that does not depend on numerology.

The numerology may be a communication parameter applied to at least one of transmission and reception of a certain signal or channel. Numerology may indicate at least one of, for example, subcarrier spacing (SCS), bandwidth, symbol length, cyclic prefix length, transmission time interval (TTI), number of symbols per TTI, radio frame configuration, specific filtering process performed by a transmitter/receiver in a frequency domain, specific windowing process performed by a transmitter/receiver in the time domain, and the like.

A slot may be configured by one or more symbols (Orthogonal Frequency Division Multiplexing (OFDM) symbols, Single Carrier Frequency Division Multiple Access (SC-FDMA) symbols, etc.) in the time domain. A slot may be a time unit based on numerology.

The slot may include a plurality of minislots. Each minislot may be formed by one or more symbols in the time domain. The minislot may also be referred to as a subslot. A minislot may be formed by fewer number of symbols than the slot. The PDSCH (or PUSCH) transmitted in a time unit larger than a minislot may be referred to as PDSCH (or PUSCH) mapping type A. The PDSCH (or PUSCH) transmitted using the minislot may be referred to as PDSCH (or PUSCH) mapping type B.

The radio frame, subframe, slot, minislot, and symbol all represent a time unit for transmitting a signal. The radio frame, subframe, slot, minislot, and symbol may have different names corresponding to thereto.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe in the existing LTE (1 ms), a period shorter than 1 ms (e.g., 1 to 13 symbols), or a period longer than 1 ms. The unit representing TTI may be referred to as a slot, a minislot, and the like instead of a subframe.

Here, TTI refers to, for example, the minimum time unit of scheduling in the radio communication. For example, in the LTE system, the base station performs scheduling to allocate the radio resource (frequency bandwidth, transmission power etc. that can be used in each user terminal) in units of TTI to each user terminal. The definition of TTI is not limited thereto.

The TTI may be a transmission time unit of a channel-encoded data packet (transport block), a code block, a codeword, or the like, or a processing unit such as scheduling, link adaptation, or the like. When a TTI is given, the time interval (e.g., the number of symbols) in which the transport block, code block, codeword, and the like are actually mapped may be shorter than the TTI.

When one slot or one minislot is referred to as TTI, one or more TTIs (i.e., one or more slots or one or more minislots) may be the minimum time unit of scheduling. Furthermore, the number of slots (the number of minislots) forming the minimum time unit of the scheduling may be controlled.

The TTI having a time length of 1 ms may be referred to as usual TTI (TTI in LTE Rel. 8-12), normal TTI, long TTI, usual subframe, normal subframe, long subframe, slot, and the like. The TTI shorter than the usual TTI may be referred to as shortened TTI, short TTI, partial TTI (partial or fractional TTI), shortened subframe, short subframe, minislot, subslot, slot, and the like.

Note that the long TTI (e.g., usual TTI, subframe, etc.) may be read as a TTI having a time length of more than 1 ms, and the short TTI (e.g., shortened TTI) may be read as a TTI having a TTI length of less than the TTI length of the long TTI and greater than or equal to 1 ms.

The resource block (RB) is a resource allocation unit in the time domain and the frequency domain, and may include one or more continuous subcarriers in the frequency domain. The number of subcarriers included in the RB may be the same regardless of the numerology, and may be, for example, 12. The number of subcarriers included in the RB may be determined based on numerology.

Furthermore, the time domain of the RB may include one or more symbols, and may be have a length of one slot, one minislot, one subframe, or one TTI. One TTI, one subframe, and the like may be configured by one or more resource blocks.

Note that one or more RBs may be referred to as physical resource blocks (Physical RB: PRB), subcarrier groups (Sub-Carrier Group: SCG), resource element groups (Resource Element Group: REG), PRB pairs, RB pairs, and the like.

Furthermore, the resource block may be configured by one or more resource elements (Resource Element: RE). For example, one RE may be a radio resource region of one subcarrier and one symbol.

A bandwidth Part (BWP) (may also be referred to as partial bandwidth) may represent a subset of consecutive common RB (common resource blocks) for a certain neurology in a certain carrier. Here, the common RB may be specified by the index of the RB based on the common reference point of the carrier. The PRB may be defined in a BWP and numbered within that BWP.

The BWP may include a BWP for UL (UL BWP) and a BWP for DL (DL BWP). One or more BWPs may be set in one carrier for the UE.

At least one of the set BWPs may be active and the UE may not assume to transmit or receive a predetermined signal/channel outside the active BWP. Note that "cell", "carrier", and the like in the present disclosure may be read as "BWP".

The structures of the radio frame, subframe, slot, minislot, symbol, and the like described above are merely examples. For example, configurations such as the number of subframes included in a radio frame, the number of slots per subframe or radio frame, the number of minislots included in a slot, the number of symbols and RBs included in a slot or minislot, the number of subcarriers included in the RB, the number of symbols in the TTI, the symbol length, the cyclic prefix (CP) length, and the like can be variously changed.

The terms "connected", "coupled", or any variations thereof mean any direct or indirect connection or coupling between two or more elements, and one or more intermediate elements may exist between two elements "connected" or "coupled" to each other. The coupling or connection between the elements may be physical, logical, or a combination thereof. For example, "connection" may be read as "access". When used in the present disclosure, it can be considered that two elements are "connected" or "coupled" to each other by using at least one of one or more electric wires, cables, and printed electrical connections, and using electromagnetic energy having wavelengths in the radio frequency domain, the microwave range and optical (both visible and invisible) domain, and the like as some non-limiting and non-inclusive examples.

The reference signal may be abbreviated as Reference Signal (RS) and may be referred to as pilot (Pilot) according to the applied standard.

The phrase "based on" as used in the present disclosure does not mean "based only on" unless clearly stated otherwise. In other words, the phrase "based on" means both "based only on" and "based at least on".

The "means" in the configuration of each of the above devices may be replaced with "unit", "circuit", "device", and the like.

Any reference to an element using designations such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some manner.

In the present disclosure, when "include", "including", and variations thereof are used, these terms are intended to be inclusive in a manner similar to the term "comprising". Furthermore, the term "or" used in the present disclosure is intended not to be an exclusive disjunction.

Throughout the present disclosure, for example, if articles such as "a", "an", and "the" in English are added due to translation, the present disclosure may include cases where the noun following these articles is in plurals.

The terms "judging" and "determining" as used in the present disclosure may include a wide variety of operations. "Judging" and "determining" may include, for example, regarding deciding, calculating, computing, processing, deriving, investigating, searching (looking up, search, inquiry) (e.g., searching in a table, a database, or another data structure), ascertaining, and the like as "judging" and "determining". Furthermore, "judging" and "determining" may include, for example, regarding receiving (e.g., receiving information), transmitting (e.g., transmitting information), input, output, and accessing (e.g., accessing data in a memory) as "judging" and "determining". In addition, "judging" and "determining" may include regarding resolving, selecting, choosing, establishing, comparing and the like as "judging" and "determining". That is, "judging" and "determining" may include regarding some operations as "judging" and "determining". Furthermore, "judgement (determination)" may be read as "assuming", "expecting", "considering", and the like.

In the present disclosure, the term "A and B are different" may mean "A and B are different from each other". It should be noted that the term may mean "A and B are each different from C". Terms such as "separated", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 radio communication system
50 CU
100A, 100B, 100C radio communication node
110 radio transmitting unit
120 radio receiving unit
130 NW IF unit
140 power control information receiving unit
150 control unit
161 radio transmitting unit
162 radio receiving unit
170 control unit
180 power control information transmitting unit
UE 200
1001 processor
1002 memory
1003 storage
1004 communication device
1005 input device
1006 output device
1007 bus

The invention claimed is:

1. A radio communication node communicating with an Integrated Access and Backhaul (IAB) donor operating as a parent node relative to the radio communication node, communicating with a child node relative to the radio communication node, and communicating with a terminal, comprising:
   a receiver that receives a first downlink signal from the IAB donor; and
   a transmitter that transmits, to the IAB donor, a first Medium Access Control-Control Element (MAC CE) including a first value for controlling transmission power of the first downlink signal, wherein the transmitter transmits, to the child node, a second MAC CE including a second value for controlling transmission power of a second downlink signal transmitted to the child node.

2. The radio communication node according to claim 1, wherein the first MAC CE includes information that designates a resource to become a target of control of the transmission power of the first downlink signal, and the second MAC CE includes information that designates a resource to become a target of control of the transmission power of the second downlink signal.

3. The radio communication node according to claim 1, wherein the first value is an offset value relative to reference power of the first downlink signal, and the second value is an offset value relative to reference power of the second downlink signal.

4. The radio communication node according to claim 3, wherein the reference power of the first downlink signal and the reference power of the second downlink signal are configured by a radio resource control layer.

5. A radio communication method performed by a radio communication node communicating with an Integrated Access and Backhaul (IAB) donor operating as a parent node relative to the radio communication node, communicating with a child node relative to the radio communication node, and communicating with a terminal, comprising:
   receiving a first downlink signal from the IAB donor;
   transmitting, to the IAB donor, a first Medium Access Control-Control Element (MAC CE) including a first value for controlling transmission power of the first downlink signal; and
   transmitting, to the child node, a second MAC CE including a second value for controlling transmission power of a second downlink signal transmitted to the child node.

\* \* \* \* \*